United States Patent Office 3,598,883
Patented Aug. 10, 1971

3,598,883
POLYVINYL ALCOHOL COMPOSITION
Hiroshi Nakamura, Uto-shi, Kumamoto-ken, and Akira Saito, Kumamoto-shi, Kumamoto-ken, Japan, assignors to Nippon Gohsei Kagaku Kogyo Kabushiki Kaisha, Osaki-shi, Japan
No Drawing. Filed Mar. 18, 1969, Ser. No. 817,350
Claims priority, application Japan, Mar. 25, 1968, 43/18,949; Feb. 10, 1969, 44/9,872
Int. Cl. C08f 29/26, 29/30
U.S. Cl. 260—874
5 Claims

ABSTRACT OF THE DISCLOSURE

This invention is a polyvinyl alcohol composition consisting essentially of a polyvinyl alcohol prepared by hydrolyzing a polyvinyl ester in presence of an alkaline catalyst and about 0.1% to about 5% by weight based upon the weight of polyvinyl alcohol of additive which is the product obtained by hydrolyzing polyvinyl acetate in the presence of an acidic catalyst in an alcoholic solution until about 20% to about 70% molar concentration of acetyl groups of polyvinyl acetate are hydrolyzed.

---

The present invention relates to a polyvinyl alcohol composition having improved properties and particularly relates to a polyvinyl alcohol composition which may give an aqueous solution thereof substantially free from bubble or foam.

Polyvinyl alcohol, one of the popular water-soluble resins, is usually produced by hydrolyzing completely or partially a polyvinyl ester, preferably polyvinyl acetate, in the presence of an alkaline catalyst such as sodium hydroxide or sodium methylate in a methanolic solution, and is applied to many uses preferably in the state of an aqueous solution. There may be various grades of polyvinyl alcohol according to the degree of hydrolysis and degree of polymerization, and so-called completely hydrolyzed grades having a degree of hydrolysis of about 98% of molar concentration and up, and so-called partially hydrolyzed grades having a degree of hydrolysis from about 80% to about 90% of molar concentration are especially preferred in many cases.

In preparing or treating a solution of polyvinyl alcohol as produced by hydrolyzing a polyvinyl ester in the presence of an alkaline catalyst according to a conventional method, however, there is an undesired tendency of the solution to bubble or foam. Bubbles or foams formed in the solution or on the surface of the solution by agitating or shaking it may hardly disappear even after the solution stands for a long period, and film made from the solution may have a rough and ugly appearance and may contain many pin holes. Further problems may occur when such a solution is used for sizing papers or textiles and preparing shaped products. The use of a conventional defoaming agent such as silicone oil, polyoxyethylene or octyl alcohol has not given any good results, because silicone oil is not sufficiently effective for the purpose. The use of polyoxymethylene may affect the adhesive ability of a polyvinyl alcohol solution and octyl alcohol gives a bad odor to a solution.

It is an object of the present invention to provide a polyvinyl alcohol composition which may give an aqueous solution substantially free from bubble or foam.

A further particular object of the invention is to provide a polyvinyl alcohol composition which may be used in the state of an aqueous solution with neither any trouble caused by bubbles or foams as formed in the solution nor any loss in the characteristics of polyvinyl alcohol.

Other objects of the invention will be apparent from the following description and claims.

It has now been found that the above objects may be attained in accordance with the present invention by adding a polymeric additive as defined below to a conventional grade of polyvinyl alcohol.

The additive as employed in the present invention is the product obtained by partially hydrolyzing a polyvinyl acetate in the presence of an acidic catalyst until about molar concentration of from about 20% to 70%, preferably a molar concentration of 30% to 60% of the acetyl groups of polyvinyl acetate are hydrolyzed. A degree of polymerization of the hydrolyzed product may be preferably selected from the range of about 100 to about 1,500, desirably from 100 to 800. The use of any hydrolyzed product having a degree of hydrolysis other than the range as described above is not preferred for the purpose of the present invention. The use of any product hydrolyzed in the presence of an alkaline catalyst is also ineffective even though a degree of hydrolysis of the product is within said range.

In preparing the additive, the hydrolysis of polyvinyl acetate may be carried out by treating an alcoholic solution of polyvinyl acetate in the presence of a small amount of an acidic catalyst at a temperature range from normal temperature to the boiling point of a solvent until the desired degree of hydrolysis is obtained. The solvent may be a lower aliphatic alcohol or its mixture with another inactive solvent such as methyl acetate, ethyl acetate or acetone. The alcohol may preferably be methanol or ethanol. Though the use of an anhydrous alcohol is desired, an alcohol containing a small amount of water may also be employed. The acidic catalyst is a member selected from the group consisting of mineral acids and alkyl esters thereof. The most preferred examples of the catalyst are hydrochloric acid, phosphoric acid, sulfuric acid, monomethyl sulfate, dimethyl sulfate, monoethyl sulfate, diethyl sulfate, monopropyl sulfate, dipropyl sulfate and the mixtures thereof. The use of an alkyl sulfate such as monomethyl sulfate or dimethyl sulfate is especially preferred for the purpose of the present invention.

In place of employing a pure alkyl sulfate, the estercontaining reaction mixture of a concentrated sulfuric acid and the corresponding alcohol may be also employed. For instance, a methanolic solution of monomethyl sulfate may be readily prepared by treating the mixture of methanol and a concentrated sulfuric acid at about 70° C. for about 1 hour or at normal temperature for about 20 hours.

By neutralizing the reaction mixture and then pouring it into a large amount of water, the hydrolyzed product is obtained in the state of a white powder which is difficultly soluble in water and is easily soluble in an organic solvent, e.g. methanol, ethanol, methyl acetate, ethyl acetate, acetone, and the like.

The thus obtained hydrolyzed product is added to a conventional grade of polyvinyl alcohol in the ratio of about 0.1% to about 5% by weight to the weight of the latter to prepare the composition in the present invention. A higher ratio than 5% by weight of the additive in the composition is not preferred, because it may make an aqueous solution of the composition cloudy. The method for mixing polyvinyl alcohol and the additive to prepare the composition is not limited to any particular way but any of the conventional methods for mixing, for instance, powder and powder, solution and solution, or powder and solution may be adopted. From the point of practical view, it is preferred to mix an alcoholic solution of the additive with the powder or an aqueous solution of polyvinyl alcohol.

The term of "polyvinyl alcohol" as used herein means any and all water-soluble resins obtained by hydrolyzing completely or partially a homopolymer or copolymer of a vinyl ester in the presence of an alkaline catalyst according to a conventional method and modified by acetalization or urethanation to the extent that water-solubility is kept. Examples of said copolymer are copolymers of vinyl acetate with a minor amount of other vinyl compounds such as vinyl chloride, acrylic esters, maleic esters, acrylic acid, etc.

The polyvinyl alcohol composition of the present invention has the same characteristics as a conventional grade of polyvinyl alcohol which consists of a major part of the composition, except that an aqueous solution of the composition has far less tendency to bubble or foam than that of a solution of any conventional grade of polyvinyl alcohol. Therefore, it may be widely applicable in various application fields for polyvinyl alcohol without any trouble caused by forming bubbles or foam in solution, and many advantages may be obtained by using the composition for uses in which an aqueous solution of polyvinyl alcohol is usually employed, especially for sizing fibers, coating papers, preparation of filaments or films and a protective colloid in an emulsion or suspension polymerization.

The following examples serve to illustrate the various embodiments of the present invention but do not limit the scope of the invention. Parts and percentages are by weight unless specified.

EXAMPLE 1

An additive as employed for preparing the polyvinyl alcohol composition in the present invention was prepared by treating a 50% methanolic solution of polyvinyl acetate with 0.65%, to the net weight of polyvinyl acetate, of monomethyl sulfate at 67° C. for about two hours and then neutralizing the reaction mixture with a solution of sodium acetate. By diluting the reaction mixture with a large amount of water, the hydrolyzed product having a degree of hydrolysis of 40% by molar concentration and a degree of polymerization of about 250 was separated as precipitate.

The composition was prepared by mixing 50 parts of a 1% methanolic solution of the additive and 100 parts of dry powder of polyvinyl alcohol having a degree of hydrolysis of 88% by molar concentration and a degree of polymerization of about 2,000, which was prepared by hydrolyzing polyvinyl acetate in the presence of an alkaline catalyst according to a conventional method, and then drying the mixture to evaporate methanol.

Thus obtained composition was dissolved in water and was used for warp sizing. Through the steps of preparation of the solution and sizing, no difficulty caused by bubbles or foam was observed.

EXAMPLE 2

In this case, the composition obtained in Example 1 was employed as a protective colloid in an emulsion polymerization of vinyl acetate. Into a reactor provided with a reflux condenser and an agitator, 86 parts of a 10.5% aqueous solution of the composition, 78 parts of water, 30 parts of vinyl acetate, 0.9 part of sodium phosphate and 3 parts of a 4.5% aqueous solution of potassium persulfate were fed and heated at 65° C. with agitation. After one hour, 96 parts of vinyl acetate and 7 parts of a 4.5% aqueous solution of potassium phosphate were additionally added and then the polymerization was continued for three hours. Through the whole process, no bubbles or foam were observed. On the other hand, when employing polyvinyl alcohol without the additive, it was observed that the space in the reactor was filled up with foam immediately after the first addition of a solution of potassium persulfate.

EXAMPLES 3 to 21

In each case, the additive was prepared in the same way as described in Example 1 except that the kind or amount of catalyst, degree of hydrolysis or degree of polymerization was varied as noted in the following table and in some examples some additional variations were made as described below. In Examples 3, 4, 18 and 19, the reaction mixture containing about 100 g./liter of monomethyl sulfate which was obtained by reacting methanol with 10%, to the weight of methanol, of concentrated sulfuric acid was employed in place of pure monomethyl sulfate. In Examples 14 and 15, ethanol and the mixture of about 42% of methanol, about 50% of methyl acetate and about 8% of water were employed as a solvent, respectively.

The obtained additive was dissolved in methanol and added into an aqueous solution of polyvinyl alcohol prepared by employing an alkaline catalyst according to a conventional method. The tendency of the thus obtained solution of the composition to bubble or foam was tested by measuring the rate of decrease in the thickness of a layer of foam formed by shaking the solution contained in a test tube of 4 cm. in diameter for five minutes.

Results are shown in the table.

Control 1 was prepared in the same way as described above with the exception that an alkaline catalyst was employed in place of an acidic catalyst in the hydrolysis step for preparation of the additive, and in each case of Controls 2, 3 and 4 a conventional grade of polyvinyl alcohol without any additive was employed for a test.

| | Additive | | | Net weight to 100 g. of polyvinyl alcohol (grams) | Polyvinyl alcohol | | |
|---|---|---|---|---|---|---|---|
| | Degree of hydrolysis (percent by mole) | Degree of polymerization | Catalyst | | Degree of hydrolysis (percent by mole) | Degree of polymerization | Concentration of solution (percent) |
| Example Number: | | | | | | | |
| 3 | 30 | 400 | Monomethylsulfate | 0.5 | 88 | 1,700 | 5 |
| 4 | 33 | 150 | ...do... | 0.5 | 88 | 1,700 | 5 |
| 5 | 41.6 | 300 | ...do... | 0.5 | 88 | 1,700 | 5 |
| 6 | 41.6 | 300 | ...do... | 0.5 | 88 | 1,700 | 1 |
| 7 | 41.6 | 300 | ...do... | 0.5 | 88 | 1,700 | 10 |
| 8 | 41.6 | 300 | Dimethylsulfate | 0.5 | 88 | 1,700 | 5 |
| 9 | 41.6 | 300 | ...do... | 2 | 88 | 1,700 | 5 |
| 10 | 41.6 | 300 | ...do... | 2 | 88 | 1,700 | 5 |
| 11 | 43 | 1,300 | Monomethylsulfate | 3 | 89 | 2,000 | 5 |
| 12 | 43 | 400 | ...do... | 0.5 | 88 | 1,700 | 5 |
| 13 | 43 | 400 | Sulfuric acid | 0.5 | 88 | 800 | 5 |
| 14 | 43 | 400 | ...do... | 0.5 | 88 | 1,700 | 5 |
| 15 | 43 | 400 | ...do... | 0.5 | 88 | 1,700 | 5 |
| 16 | 43 | 400 | Hydrochloric acid | 0.5 | 88 | 1,700 | 5 |
| 17 | 43 | 400 | Phosphoric acid | 0.5 | 88 | 1,700 | 5 |
| 18 | 50 | 450 | Monomethyl sulfate | 0.5 | 88 | 1,700 | 5 |
| 19 | 55 | 600 | ...do... | 0.5 | 88 | 1,700 | 5 |
| 20 | 60 | 350 | ...do... | 4.5 | 88 | 1,700 | 5 |
| 21 | 43 | 400 | ...do... | 0.5 | 98 | 1,000 | 5 |
| Control 1 | 45 | 300 | NaOH | 0.5 | 88 | 1,700 | 5 |
| Control 2 | | | | | 88 | 1,700 | 5 |
| Control 3 | | | | | 88 | 1,700 | 1 |
| Control 4 | | | | | 98 | 1,000 | 5 |

TABLE—Continued

| Example Number: | Thickness of a layer of foams (mm.) after— | | | | | | | | | | | |
|---|---|---|---|---|---|---|---|---|---|---|---|---|
| | Immediately after shaking | 2 minutes | 4 minutes | 5 minutes | 6 minutes | 8 minutes | 10 minutes | 15 minutes | 20 minutes | 25 minutes | 30 minutes | 60 minutes |
| 3 | 25 | | | 4 | | | 1 | 0 | | | | |
| 4 | 45 | | | 20 | | | 4 | 1 | 0 | | | |
| 5 | 23 | | | 6 | | | 1 | 0 | | | | |
| 6 | 62 | 20 | 17 | | 7 | 5 | 3 | 1 | 0 | | | |
| 7 | 20 | | | 4 | | | 2 | 0 | | | | |
| 8 | 22 | | | 5 | | | 2 | 0 | | | | |
| 9 | 19 | | | 4 | | | 1 | 0 | | | | |
| 10 | 18 | | | 3 | | | 0 | | | | | |
| 11 | 49 | | | 24 | | | 10 | 5 | 1 | 0 | | |
| 12 | 38 | | | 12 | | | 6 | 1 | 0 | | | |
| 13 | 35 | | | 15 | | | 7 | 3 | 0 | | | |
| 14 | 34 | | | 16 | | | 8 | 5 | 1 | | 0 | |
| 15 | 37 | | | 18 | | | 9 | 6 | 1 | | 0 | |
| 16 | 35 | | | 15 | | | 8 | 3 | 0 | | | |
| 17 | 37 | | | 16 | | | 7 | 2 | 0 | | | |
| 18 | 32 | | | 7 | | | 2 | 0 | | | | |
| 19 | 51 | | | 15 | | | 6 | 2 | 0 | | | |
| 20 | 47 | | | 23 | | | 8 | 4 | 1 | | 0 | |
| 21 | 17 | | | 8 | | | 3 | 1 | 0 | | | |
| Control 1 | 53 | | | 44 | | | 36 | 25 | 15 | 6 | 0 | |
| Control 2 | 58 | | | 50 | | | 44 | 44 | 39 | 35 | 31 | 4 |
| Control 3 | 90 | 75 | 38 | | 20 | 10 | 5 | 3 | 1 | 0 | | |
| Control 4 | 36 | | | 24 | | | 18 | 12 | 7 | 6 | 4 | |

What we claim is:

1. A polyvinyl alcohol composition consisting essentially of polyvinyl alcohol prepared by hydrolyzing a polyvinyl ester in the presence of an alkaline catalyst and about 0.1% to about 5% by weight of an additive to the weight of polyvinyl alcohol; said additive being the product obtained by hydrolyzing polyvinyl acetate in the presence of an acidic catalyst in an alcoholic solution until about 20% to about 70% by mole of acetyl groups of polyvinyl acetate are hydrolyzed.

2. A composition as claimed in claim 1, in which said acidic catalyst is a member selected from the group consisting of mineral acids and alkyl esters thereof.

3. A composition as claimed in claim 2, in which said mineral acid is a member selected from the group consisting of sulfuric acid, hydrochloric acid and phosphoric acid.

4. A composition as claimed in claim 2, in which said alkyl ester is a member selected from the group consisting of monomethyl sulfate, dimethyl sulfate, monoethyl sulfate, diethyl sulfate, monopropyl sulfate and dipropyl sulfate.

5. A composition as claimed in claim 1, in which said alcoholic solution is a methanolic solution.

References Cited

UNITED STATES PATENTS 1,998,544   4/1935   Jochum et al. _____ 260—874

SAMUEL H. BLECH, Primary Examiner

U.S. Cl. X.R.

117—155, 161UE; 260—29.6R, 31.2R, 32.8R, 33.4R, 89.1, 91.3R, 91.3PV